May 16, 1939. W. E. SHENK 2,158,438
RELAY DEVICE
Filed June 25, 1936 3 Sheets-Sheet 1
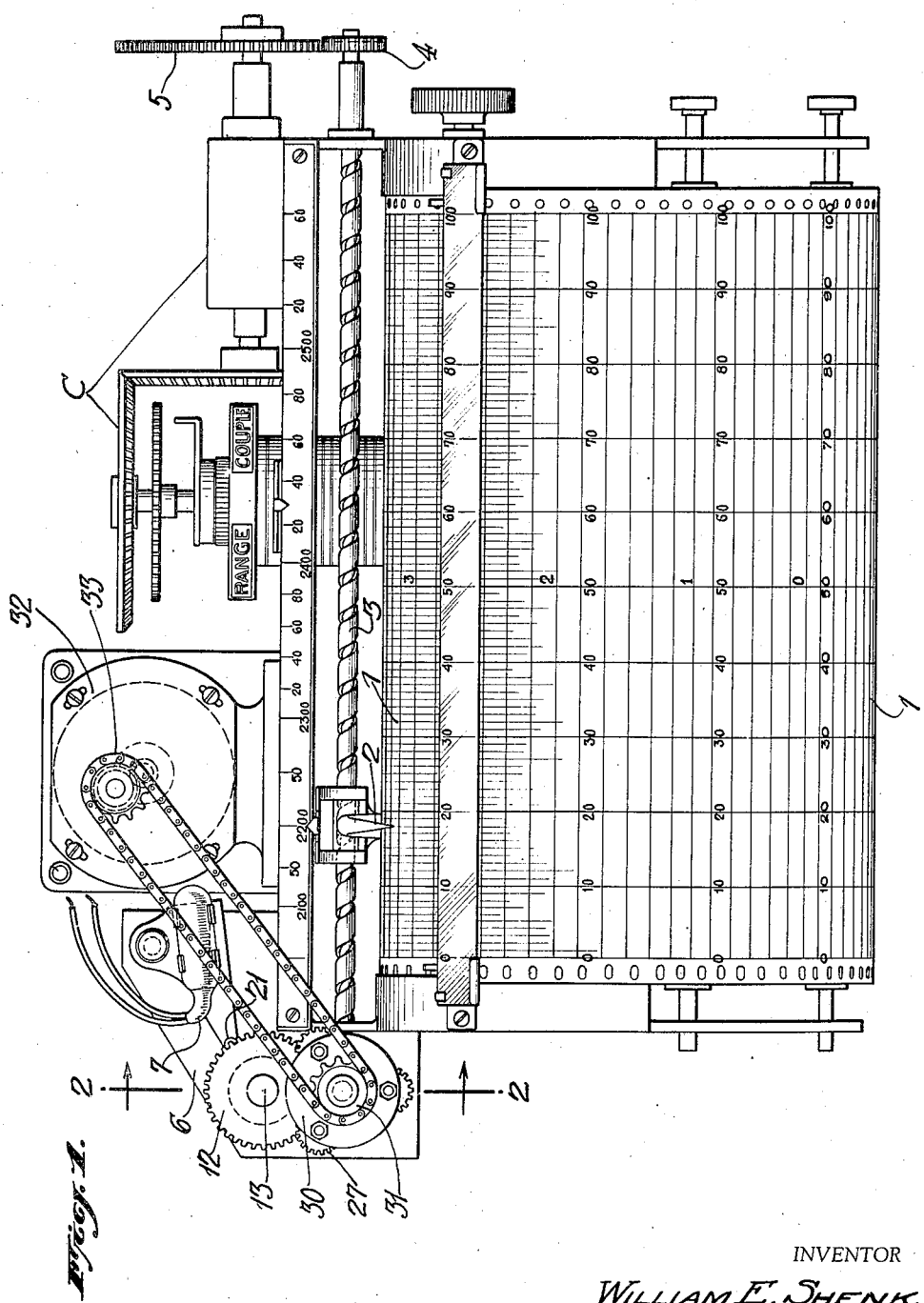
INVENTOR
WILLIAM E. SHENK.
BY
ATTORNEYS

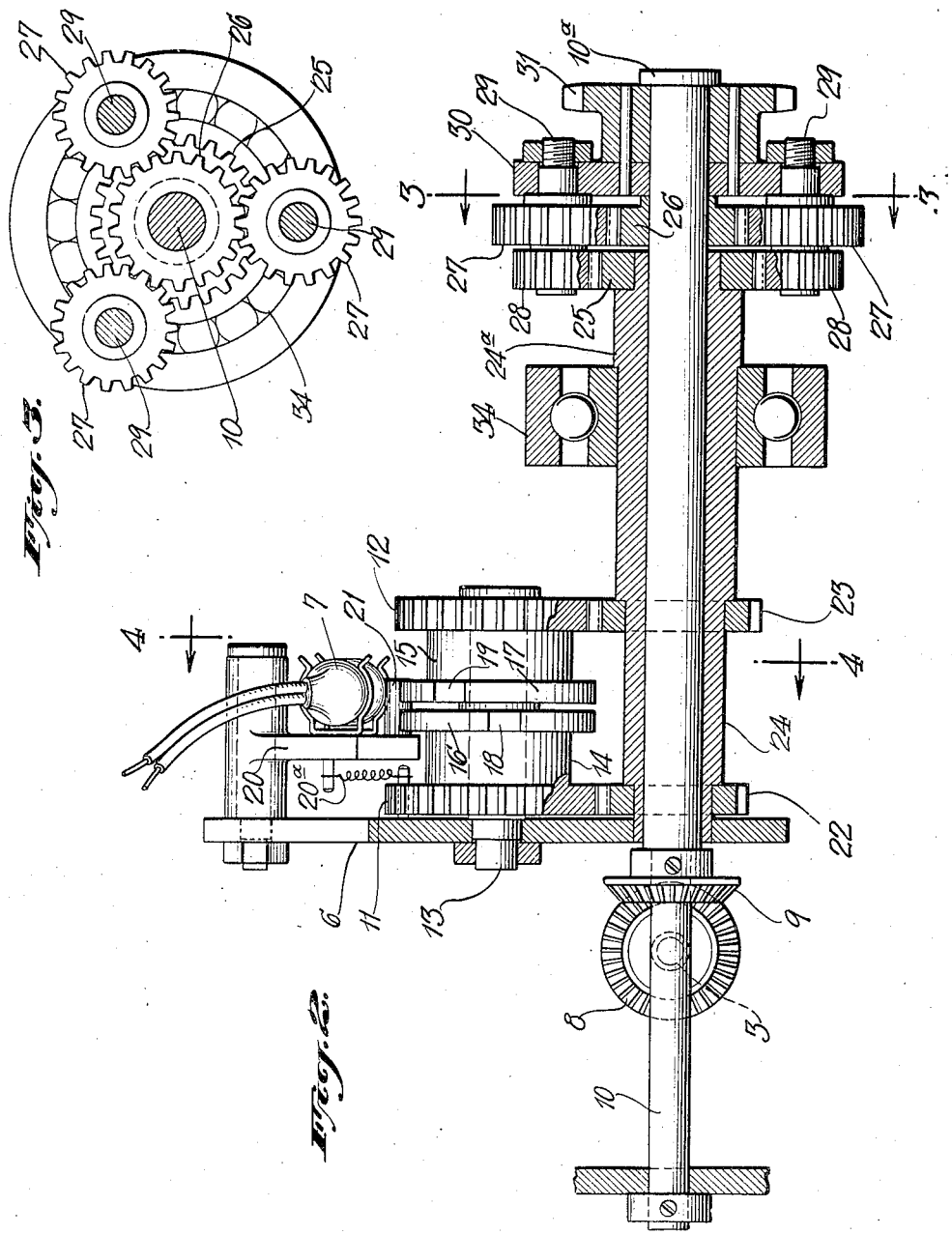

May 16, 1939.   W. E. SHENK   2,158,438
RELAY DEVICE
Filed June 25, 1936   3 Sheets-Sheet 3
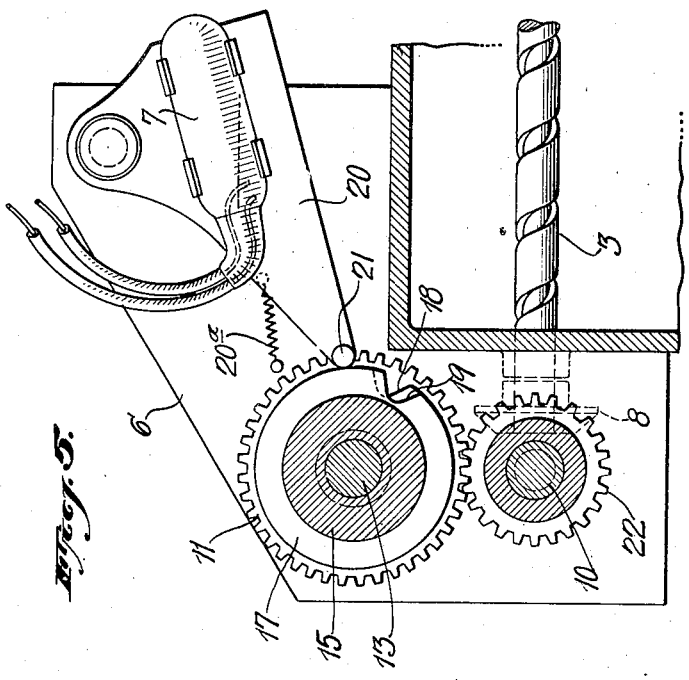
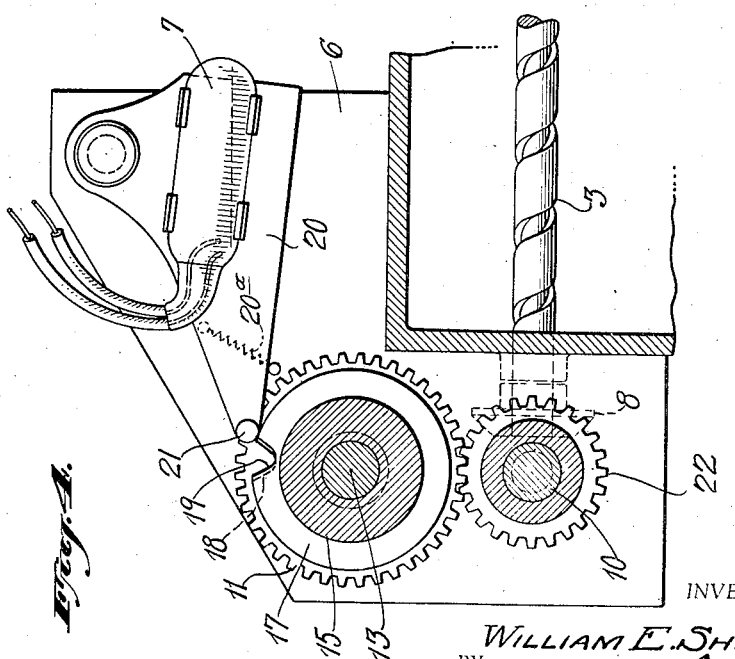
INVENTOR.
WILLIAM E. SHENK.
BY
ATTORNEYS Patented May 16, 1939

2,158,438

UNITED STATES PATENT OFFICE 2,158,438

RELAY DEVICE

William E. Shenk, East Orange, N. J., assignor to United States Steel Corporation, New York, N. Y., a corporation of New Jersey Application June 25, 1936, Serial No. 87,304

4 Claims. (Cl. 200—136)

This invention relates to electrical devices and more particularly to an improvement of a limit relay device for use in connection with potentiometric recorders whereby the operating point of the temperature limit element in said device can be changed automatically.

The potentiometric recorder device, which includes a limit relay, is a device heretofore available in the art, and is usually employed in association with one or more thermal sensitive devices, such as a pyrometer, for the purpose of simultaneously recording and controlling the temperatures in furnaces of various kinds. The recorder device per se forms no part of the present invention and will be described only as to its essential operating elements. These in brief are a pen element and mechanism energized by a thermal sensitive device to actuate the pen element to thereby record on a chart certain markings indicating the thermal condition of the thermal sensitive device. In such a recorder device it is usual to provide a relay device which is energized or deenergized through the operation of a switch. The operation of the switch is accomplished by the pen element moving to a determined position while recording temperature conditions on the chart.

Heretofore in the art it has been customary to provide a tiltable mercury tube switch arranged with respect to a gear train operated by the same mechanism operating the pen, to be tilted in circuit making or breaking position (as desired) when the pen assumes a determined position. This assembly has been arranged mechanically so that the determined position of the pen at which the gear train operates to tilt the mercury tube switch may be manually set to any desired position along the scale of temperatures. The operation of the mercury switch functions generally to control the supply of heat energy to the furnace, shutting off the energy when the temperature attains a desired maximum determined by the position of the temperature limit element of the recorder device.

In the use and adaptation of this recorder device to the measurement and recording of the thermal conditions in two or more furnaces or at two or more points in the same furnace, means are provided alternately to connect the thermal sensitive devices to the pen means. This type of recorder is generally known as a "two point" recorder. In such devices it is frequently desired to automatically reset or change the temperature limit at which the pen operates to move the limit switch subsequent to temperature recording by either one of the thermal sensitive devices. The recorder devices heretofore provided have not provided means to accomplish this result.

One of the objects of the present invention is to provide means to automatically adjust or set the temperature limit in potentiometric recorder devices. Another object of the present invention is to provide means to automatically reset the temperature limit of "two point" recorder devices after the recording by one thermal sensitive device. Still another object is to provide such means which is operative to reset the temperature limit to some determined point or to some point which bears a determined relation with respect to the temperature attained or measured by the pen during energization by the thermal responsive device previously in circuit.

Other objects and advantages will be apparent as the invention is more fully disclosed. Before further disclosure of the present invention reference should be made to the accompanying drawings wherein:

Fig. 1 is a view of a recorder device stripped of its non-essential elements and modified in accordance with the present invention; Fig. 2 is a section along plane 2—2 of Fig. 1; Fig. 3 is a section along plane 3—3 of Fig. 2; Fig. 4 is a section along plane 4—4 of Fig. 2 illustrating one operating position of the mechanism; and Fig. 5 is a similar view illustrating a second operating position of the assembly.

Referring to Fig. 1, the recorder device includes as essential operating elements moving chart 1, a recording pen 2 and means 3 to actuate the pen 2 in such manner as to trace a record on the chart of the thermal conditions at the thermal sensitive device (not shown). This means 3 is operated through means C energized by the thermal sensitive device and operatively connected through gears 4 and 5 to drive the mechanism 3 in forward or reverse motion thereby moving pen 2 horizontally to the left or right across the face of chart 1.

The recorder contains a limit relay device which consists of a gear train (indicated in Fig. 1 generally by numeral 6) which is actuated by the same mechanism 3 which actuates pen 2 and a mercury tube switch 7 which is arranged to be tilted at a predetermined position of the gear train 6. Switch 7 controls the energization and de-energization of an electrical circuit which in general controls the supply of heat energy to the furnace or other instrumentality, the temperature of which is being recorded by pen 2.

The predetermined position of gear train 6 heretofore has been obtained through a manual adjustment of the mechanism. The pen 2 is manually moved to the temperature at which switch 7 operation is desired, and the gear train mechanism 6 is then manually adjusted so that switch 7 operates at this desired temperature. This manual adjustment of the gear train 6 has heretofore been obtained through a friction coupling between pen operating mechanism 3 and the gear train 6. After the pen 2 is set at the determined position mechanism 3 is held stationary while gear train 6 is moved against friction to the position where switch 7 is operated. Until the determined position of pen 2 is again changed, switch 7 will always operate when the mechanism 3 moves pen 2 and gear train 6 to this same position. The manner of operation of switch 7 by gear train 6 will be more fully hereinafter disclosed.

In accordance with the present invention this manual operation involved in the setting of the temperature limit for the operation of switch 7 is eliminated and means are provided to set the limit automatically. Briefly this comprises a differential coupling in place of the usual friction coupling heretofore provided, a reversible motor operatively connected through the differential coupling to transmit either forward or reverse motion to the said gear train 6 irrespective of any motion being transmitted thereto by the pen operating mechanism 3.

Thus, for example, in a one point recorder device, I may through energization of the reversible motor automatically move the gear train 6 to switch operating position irrespective of any temperature limit to which it may be adjusted. Contrary, I may through reverse operation of the motor reverse the motion of the gear train 6 and either prevent the train from assuming a switch operating position or if such position has been attained bring the train back to a reverse operation of the switch 7.

Again, for example, in a two point recorder device, I may utilize the motion of the motor as a means for obtaining an automatic resetting of the temperature limit each time the recorder shifts to record the thermal conditions at one or the other thermal sensitive devices. Or I may utilize the motor as a means to maintain substantially identical or equal thermal conditions in the two or more furnaces in which the said thermal sensitive devices are disposed, the operation of switch 7 controlling the supply of heat energy thereto.

Thus it will be apparent that the present invention is adapted to wide use in the art, depending upon the specific purposes in view. In the following description several adaptations of the present invention will be described as examples but not as a limitation on the present invention.

Referring to Fig. 2, the end of the shaft of mechanism 3 operating pen 2 as heretofore disclosed is indicated in dotted lines. On the end of this shaft is disposed bevelled gear 8 which engages with a second bevelled gear 9 disposed on shaft 10 which operates the gear train 6 (Fig. 1) above referred to. Heretofore, shaft 10 has been operatively connected to gear train 6 (Fig. 1) through a friction coupling therebetween. In the present invention this friction coupling is eliminated and a differential coupling substituted therefor, the substitution for the purposes of the present invention requiring the addition to the assembly of all of the elements indicated to the right of gear 23 (Fig. 2), ball-bearing support means 34 being provided therefor.

Gear train 6 comprises essentially a pair of spaced gears 11 and 12 rotatively supported on shaft 13 and each of the gears 11 and 12 are provided with extensions 14 and 15 terminating in slotted discs 16 and 17. Discs 16 and 17 each have slots 18 and 19 of different widths and switch 7 is mounted upon arm 20 in such position that when discs 16 and 17 are rotated into such position as to bring slots 18 and 19 in alignment the end 21 of the arm 20 will fall into the slots thereby tilting mercury switch 7 into circuit opening or closing position as the case may be.

Rotation of discs 16 and 17 is obtained by means of gears 22 and 23 keyed to sleeve 24 rotatively mounted on shaft 10. Gears 22 and 23 are of different pitch diameters so that gears 11 and 12 meshing therewith and rotated thereby rotate at different speeds.

The preferred arrangement provides that as the recorder pen 2 moves up scale towards the determined control point, the slots 18 and 19 in the discs 16 and 17 respectively come into juxtaposition (when the control point is reached) through clockwise rotation of the discs and pin 21 on the end of arm 20 falls into the slots by virtue of the force exerted by spring 20a on arm 20. As the recorder pen continues to move up scale above the control point, pin 21 is carried out of slots 18 and 19 and arm 20 is tilted into the position shown in Fig. 5. Pin 21 is held against the discs by the spring 20a. Now as the recorder pen moves down scale towards the control point, the discs turn counter-clockwise and at the control point pin 21 falls into the slots 18 and 19 by virtue of the pull of spring 20a on arm 20. As the pen continues down scale, pin 21 is carried out of the slots again and is left in the position shown in Fig. 4.

One end of the spring 20a is anchored to plate 6 at a point on a line passing through the center of rotation of arm 20 and the center of rotation of the discs 16 and 17, as shown in Fig. 5. The other end of the spring is anchored to arm 20 at a point on a line passing through the center of rotation of arm 20 and the center or axis of pin 21 such that, whenever this line is displaced angularly from the said center line passing through the center of rotation of arm 20 and of discs 16 and 17, the spring exerts a force opposing the displacement. With this arrangement, the spring always holds pin 21 against the periphery of the discs.

In the substitution of a differential coupling for the frictional coupling heretofore provided, I extend sleeve 24 a distance beyond gear 23 (Fig. 2) and extend shaft 10 similarly. The extension of sleeve 24 is indicated as 24a. The extension of shaft 10 is indicated as 10a. To the end of extension sleeve 24a is keyed gear 25.

The differential coupling of the present invention comprises a pinion 26 keyed to shaft extension 10a to rotate therewith. Planetary gears 27 and 28, which are fastened together but free to rotate on shafts 29, are disposed relative to pinion 26 to mesh therewith and to be rotated thereby, thereby transmitting the motion of shaft 10—10a to sleeve 24a (and 24) thence to gear train 6 as heretofore described.

Spider 30 and sprocket wheel 31 are rotatively mounted on the extending end of shaft extension 10a but are keyed to each other. Shafts 29 of planetary gears 27 and 28 extend through spider 30 and are attached thereto so that on rotation of differential coupling, spider 30 rotates therewith. It is apparent, however, that spider 30 may be itself rotated without rotating shaft 10—10a.

With this arrangement of elements, I may by a rotation of spider 30 in either direction impart through planetary gears 27 and 28 this motion to sleeve 24—24a and thence to gear train 6. With shaft 10—10a stationary this motion is fully transmitted. With shaft 10—10a in motion, the motion imparted by the rotation of spider 30 in either direction either adds to or subtracts from the motion imparted to sleeve 24—24a by shaft 10—10a through the differential coupling.

The rotation of spider 30 in either direction may be accomplished most conveniently by means of a reversible motor 32 (Fig. 1) operatively connected through chain drive 33 to sprocket 31. The energization of motor 32 and the application of the motion thus obtained in either direction to gear train 6 may be made in a variety of ways and for a plurality of purposes as may be readily perceived.

As one specific adaptation of this invention, in automatically setting the temperature limit, the pen 2 may be manually moved to the temperature at which the limit switch 7 is desired to operate and motor 32 may then be energized in either direction until gear train 6 just operates the switch. Thereafter, upon actuation of mechanism 3 by the thermal sensitive device pen 2 is moved with consequent actuation of shaft 10—10a through differential coupling, sleeve 24—24a and gear train 6.

This automatic setting of the temperature limit may be obtained independently of the pen 2 setting, as for example, with a known gearing relationship in the assembly and a known speed of motor, a time interval may be calculated which will actuate gear train 6 into such position as will operate switch 7. This manner of setting may be employed, for example, in limiting the temperature increase in a furnace to a desired maximum for any given time interval to obtain thereby a gradual and uniform heating up of the furnace, with switch 7 controlling the supply of fuel to the furnace.

As a second specific adaptation of this invention, the automatic setting or adjustment of the temperature limit may be correlated in some manner with respect to two readings being taken at separated points in the same furnace or in different furnaces, as in the use of a "two point" recorder.

In the operation, for example, of a regenerative furnace it is desirable to maintain substantially uniform temperatures at the opposite furnace ends. The usual regenerative furnace consists of an enclosed hearth fired alternatively at opposite ends. The gases of combustion during one period of firing are conducted through a so-called checker chamber into a flue or stack. Upon reversal the air to support combustion is supplied to the furnace and preheated by passing the same through this heated checker chamber. The outgoing gases during this cycle of heating are passed through a second checker chamber and upon reversal preheated air to support combustion is obtained by passing the air through this second checker chamber. Reversal of the furnace is usually made at determined time intervals and it is easily recognized that starting with substantially cold furnace and checker chambers the relative temperatures attained in opposite checkers may vary widely. As the furnace becomes heated to its approximate maximum temperature, the temperatures attained in the checkers frequently vary more widely than during the heating up period due to excessive heat energy evolved from the metal bath on the furnace hearth. Moreover, it is exceedingly difficult to maintain the supply of fuel at opposite furnace ends substantially equal during any one furnace run. This inequality of heating causes a great deal of trouble and loss in efficiency and frequently results in overheating the refractory brick work in the checker chambers.

By the practice of the present invention in association with a "two point" recorder the maintenance of substantially uniform temperatures in the two checker chambers may be attained together with substantially complete protection of the same from overheating during any one cycle of heating. I accomplish this by electrically connecting the motor 32 to a time delay relay in such manner that during the heating up period of the furnace the time of heating the following checker is extended until the temperature attained therein approximates that attained in the previous checker. Thus, when the first checker is heated to a temperature recorded by pen 2 during a given time interval the energization of motor 32 resulting sets automatically the gear train 6 to operate switch 7 when the temperature of the opposite checker attains this temperature within the same time interval, or if it does not attain this temperature within the time delay relay automatically extends the time interval sufficient to permit the checker to attain this temperature whereupon switch 7 is operated, and the operation of the switch 7 results in the energization of means to automatically reverse the furnace.

Thus as each checker becomes heated to higher and higher temperatures to the maximum temperature originally set by pen 2, each checker substantially is in thermal equality. As the temperatures approach the maximum temperature the time period of reversal automatically is shortened by the operation of limit switch 7 at any time prior to the expiration of the set time period if the temperature attained by the checker equals or exceeds that attained by the opposite checker during the previous time interval.

The particular electrical circuit involved in the energization of motor 32 in accordance with the above described specific embodiment forms no part of the present invention and need not be more fully described nor illustrated. Reference should be made to co-pending applications Serial No. 31,740, filed July 16, 1935; Serial No. 43,786, filed October 5, 1935; Serial No. 52,400, filed November 30, 1935.

Having therefore fully described and illustrated the present invention and having described the extent to which it may be adapted in the art, it is apparent that many modifications and adaptations of the same may be made. Such modifications and adaptations are contemplated as may fall within the scope of the following claims.

What I claim is:

1. In combination, a tiltable switch means, a gear train adapted to tilt said switch at a determined and set position of said gear train, means to actuate said gear train, a differential coupling connecting said means to said gear train, and means operatively connected through said differential coupling to said gear train to actuate said gear train in either direction independently of the actuation of the gear train by said gear train actuating means.

2. In combination, a mercury tube switch, means to support said switch in a position to be tilted about an axis to circuit closing and opening positions, means to tilt said switch, said means being adjustable and including a gear train to actuate said tilting means and means to actuate said train, a differential coupling to transmit motion from the gear train to the said tilting means, a reversible motor and means operatively connecting said motor to transmit forward and reverse motion of the motor through said differential to said tilting means independently of the motion being transmitted thereto by the said gear train.

3. In combination, a gear train means to actuate said gear train, a differential coupling connecting the said gear train to the said actuating means, a mercury tube switch operatively positioned with respect to said gear train to be tilted thereby into circuit opening and closing position when the said gear train assumes a determined position, a reversible motor and means to transmit forward and reverse motion of said motor through the said differential coupling to said gear train independently of the motion transmitted thereto by said actuating means thereby to adjust and otherwise control and regulate the operation of the said gear train to the position effecting the tilting of the said mercury tube switch.

4. In combination, a mercury tube switch, support means therefor adapting the said switch to be tilted about an axis into circuit making and breaking positions, a gear train operatively connected with said mercury switch to effect said tilting of the switch when rotated into a determined position, a means to actuate said gear train, a differential coupling operatively connecting said actuating means to the said gear train to transmit forward and reverse rotary motion thereto, a reversible motor and means operatively connecting said motor through said differential coupling to the said gear train to transmit forward and reverse motion of the motor to the said gear train independently of the motion being transmitted thereto by the said actuating means, thereby obtaining a control over the operation of the said gear train by the said actuating means and the rotation of the train into said determined position wherein tilting of said switch is effected.

WILLIAM E. SHENK.